June 2, 1931.  G. WALKER  1,807,643
SCALE
Filed Feb. 17, 1926   2 Sheets-Sheet 1
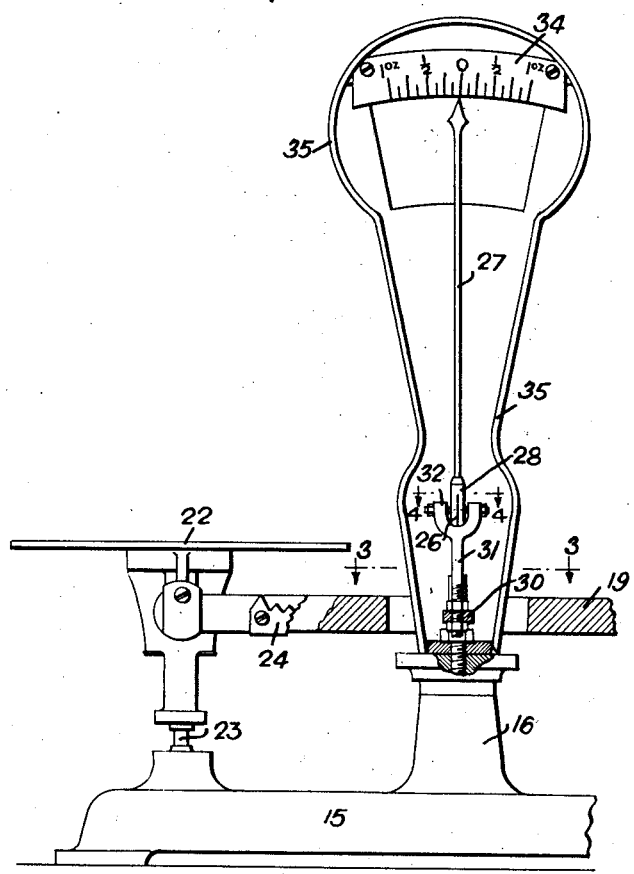
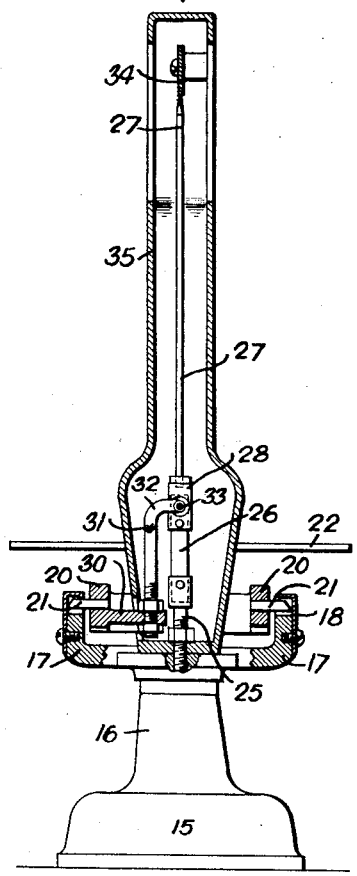
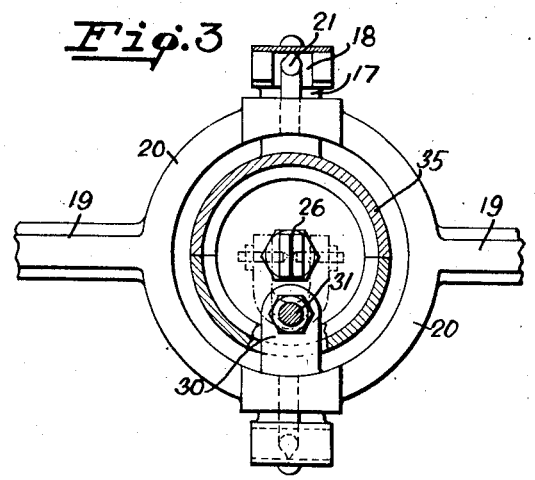
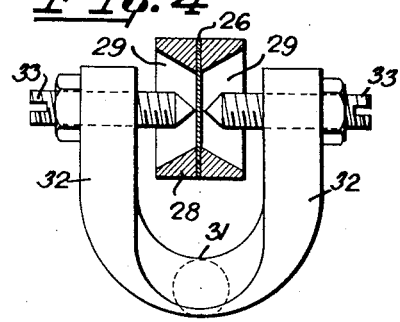
INVENTOR.
George Walker
BY
Mayer, Warfield Watson
ATTORNEYS.

June 2, 1931.   G. WALKER   1,807,643
SCALE
Filed Feb. 17, 1926   2 Sheets-Sheet 2
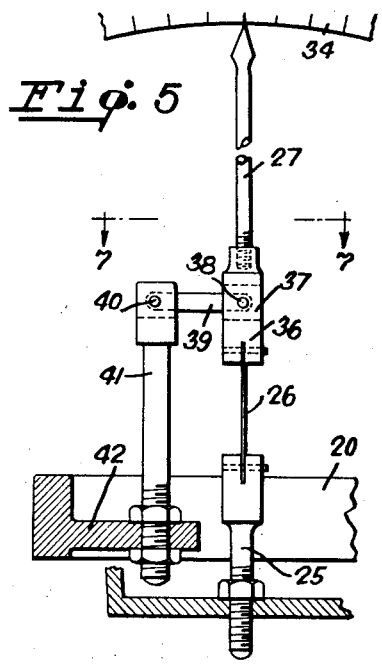
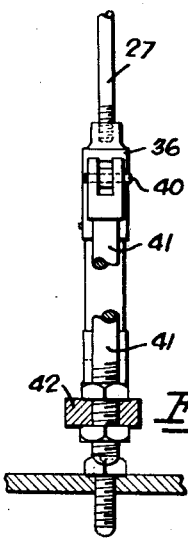
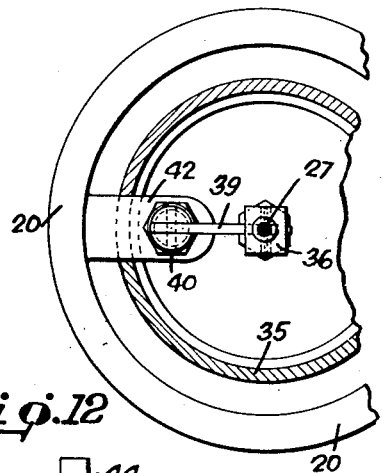
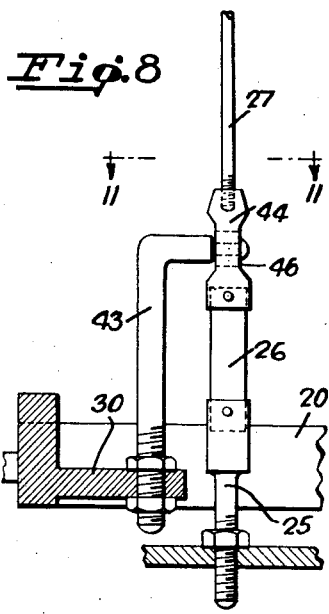
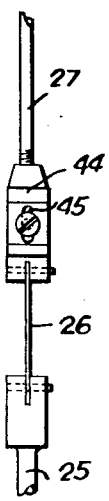
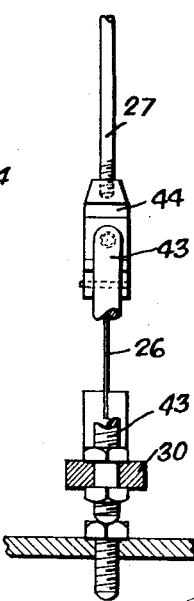
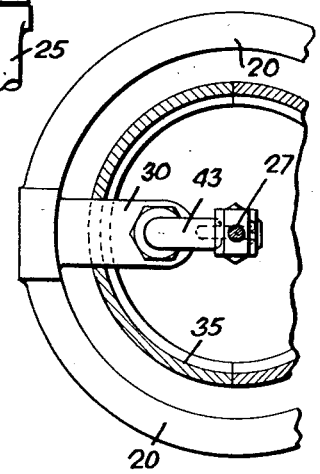
INVENTOR.
George Walker
BY
Mayer, Warfield Watson
ATTORNEYS.

Patented June 2, 1931

1,807,643

UNITED STATES PATENT OFFICE

GEORGE WALKER, OF BROOKLYN, NEW YORK, ASSIGNOR TO THE JACOBS BROTHERS CO., INC., OF BROOKLYN, NEW YORK, A CORPORATION OF NEW YORK

SCALE

Application filed February 17, 1926. Serial No. 88,723.

This invention relates to a scale of improved construction.

It is an object of the invention to provide a device of this character preferably of the even-balance beam type, in which the parts will assume their neutral or zero position irrespective of the fact that the scale is not mounted in a true horizontal plane, this result being achieved in a functionally and structurally improved manner.

A further object of the invention is that of providing a scale which will register any over- or under-weight in such a manner that it will be readily apparent to the user, this result being also achieved in a functionally and structurally improved manner.

A still further object is that of providing a scale capable of accomplishing the objects aforementioned, and the parts of which will be comparatively few in number, these parts being individually simple in construction and being capable of being readily assembled to provide a finished scale which will operate accurately over long periods of time without necessity of repair or replacement.

Other objects of the invention will in part be obvious and will in part appear hereinafter.

The invention accordingly comprises the features of construction, combination of elements and arrangement of parts which will be exemplified in the construction hereinafter set forth, and the scope of the application of which will be indicated in the claims.

For a fuller understanding of the nature and objects of the invention reference should be had to the following detailed description taken in connection with the accompanying drawings, in which:

Figure 1 is a front elevation of one form of scale embodying the improved construction of the present invention, certain of the parts being shown in section or broken away to disclose the underlying construction;

Fig. 2 is a sectional side elevation of the scale;

Figs. 3 and 4 are fragmentary enlarged sectional plan views taken along the lines 3—3 and 4—4, respectively, of Fig. 1;

Fig. 5 is an enlarged sectional front elevation of a form of construction slightly different from that shown in the preceding figures;

Fig. 6 is a fragmentary sectional side view of the parts as shown in Fig. 5;

Fig. 7 is a sectional plan view taken along the lines 7—7 of Fig. 5;

Fig. 8 is a partly sectional fragmentary side elevation of still another form of construction;

Fig. 9 is a fragmentary rear view thereof;

Fig. 10 is a fragmentary front view of these parts;

Fig. 11 is a sectional plan view taken along the lines 11—11 of Fig. 8; and

Fig. 12 is a fragmentary partly sectional front view of still another form of construction which may be utilized within the terms of the present invention.

In the drawings the invention has been shown in connection with an "even-beam balance" type of scale, and in Figs. 1 and 2 the numeral 15 indicates the base of this scale, which may be of any desired design and which is provided adjacent its central portion with a post 16 mounting a yoke 17, which in turn supports bearings 18. A beam 19 is in the present instance formed with a central collar portion 20, to which pivot members 21 are secured; these fulcrums or blades contacting with the bearings 18 for the purpose of rockingly mounting the beam. Suitably secured to the ends of the beam are pans or platforms 22, from which stems 23 extend downwardly through openings in the base, the lower ends of these stems preferably being attached to checkrods (not shown).

The members 21 supporting the beam are conveniently disposed substantially in line with the center of gravity thereof, so that under all conditions the beam will tend to assume an equal-balance or zero position, it being understood that a dashpot (not shown) is preferably associated with the beam for the purpose of dampening the oscillations thereof and inducing the same to assume a stabilized position in a minimum period of time. Furthermore, if desired, the beam may support a rackbar 24, a fragment of which has been shown in Fig. 1, and a weight may be slidably mounted upon this rackbar in order that an operator may readily bring the parts into a position indicating a proper counter-balance thereof.

Mounted upon the post 16 is a stem 25, to the upper end of which a flexible element, such as a flat spring strip 26, is attached, it being observed that the lower end of this spring is rigidly mounted by the stem in a plane beyond that in which the line of pivoting of the beam occurs. A pointer 27 is attached to the upper end of this strip by utilizing a mounting member 28 to which this pointer is secured, the mounting member being in turn clamped to the upper end of the strip 26.

As has been shown in Fig. 4, the side faces of the member 28 may be formed with openings 29, so that the side faces of the strip 26 are exposed adjacent the upper end thereof and at points beyond which this strip is clamped by the member 28. The beam carries a foot portion or extension 30, and a fork 31 has its lower end firmly secured to this portion, the arms 32 of this fork extending one to each side of the member 28 and mounting opposed pins 33 having their inner ends preferably terminating in reduced portions which slidably bear against the strip 26 within the space defined by the edges of the openings 29.

Due to the fact that the strip 26 is mounted to normally extend at right angles to the axis of the base, and, furthermore, for the reason that this strip is connected with the beam, it will be apparent that the latter will at all times tend to assume a zero or neutral position. This will be the case even though the base is not in true horizontal position, for the reason that the beam is preferably mounted at its center of gravity and the spring tends to extend at right angles to the axis of the beam when in such position. Incident to the connection established by the forked member the impulse of the spring is transmitted to the beam and the desired result will be achieved. In the event that the parts do not properly counterbalance, i. e., the weight upon one platform or pan is in excess of that upon the second supporting member associated with the beam, it will be obvious that the spring will be flexed to one side or the other out of the position which it tends to maintain, and, as a consequence, the pointer will be diverted beyond its central position.

It is preferred to employ a scale or index 34 in connection with this apparatus, this index being mounted in a housing 35 of any suitable design which is supported upon the post 16 and which incidentally serves to enclose the spring, pins, etc. If this index is suitably graduated, as has been shown, the amount of deflection of the pointer will be accurately registered, and, accordingly, the amount of over- or under-weight indicated by the scale may be positively ascertained. Due to the fact that the lower end of the strip 26 extends above the line of pivotal mounting of the beam, this indication will not be of that negligible type which would occur if the pointer were directly secured to the beam. Rather, according to the plane at which the lower end of the spring is rigidly attached above the plane of beam-pivoting and the point at which the connection between this spring and the beam occurs, the pointer will be deflected along the index to a marked extent.

With reference to the form of construction shown in Figs. 5, 6 and 7, it will be observed that the supporting member 36 is formed with an opening 37, across which a pin 38 extends, one end of a link 39 being attached to this pin, the opposite end of the link being secured to a pin 40 mounted on the upper end of a post 41, in turn secured to an extension 42 forming a part of the beam and extending in line with the line of oscillation of the latter. Obviously, in this form of construction the same results will follow as aforedescribed in connection with the form of the invention shown in Figs. 1 to 4 inclusive.

In the form of device shown in Figs. 8 to 11 inclusive an angle-rod 43 is secured to the extension or foot 30 of the beam in lieu of the fork member 31, and the member 44 which connects the pointer with the spring strip 26 is formed with a longitudinally-extending slot 45 in line with the spring edge. The end of the rod may be reduced as at 46 and extend through the slot 45, and, if desired, this reduced end portion may be headed, as has been shown. Obviously, as the beam rocks the beam 44 and the pointer carried thereby will be deflected, but, normally, the strip 26 will bring the parts to their neutral or zero position even if the scale is not in a true horizontal plane.

If, as in Fig. 12, it is desired to utilize a spiral spring rather than the strip 26, the upper end of the stem 25 may be formed with a screw thread 47, and the end of the supporting member 44 may be reduced and formed with a corresponding screw thread 48. A coil-spring 49 of suitable quality is interposed between these elements and has its convolutions threaded into the grooves of these members, thus properly connecting the same and serving to maintain the parts in zero position, as has been aforedescribed in connection with the preceding forms of the invention.

Thus, among others, the objects of this invention have been accomplished, and since certain changes may be made in the above construction, and different embodiments of the invention could be made, without departing from the scope thereof, it is intended that all matter contained in the above description or shown in the accompanying drawings, shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent is:

1. A scale, including a rockingly-mounted beam, a spring adjacent said beam, means connecting said beam and spring and including rigid means fixed with respect to said beam and means providing a friction connection between said rigid means and said spring to cause said beam to tend to assume a neutral position, and a registering mechanism, one of the elements of the same being directly secured to said spring whereby any deflection of said beam beyond said position will be registered.

2. A scale, including a normally horizontal rockingly-mounted beam, a normally vertically extending spring, means for rigidly supporting the lower end of said spring, and rigid means fixedly secured to said beam and having connection with said spring adjacent the upper end thereof whereby when said beam is rocked the spring will be flexed to both sides of the vertical, said spring serving normally to maintain the horizontal position of said beam.

3. A scale, including a rockingly-mounted beam, a spring, means above the plane of pivotal mounting of said beam for supporting the lower end of said spring, rigid means fixedly secured to said beam, means providing a friction connection between said last named means and said spring whereby said beam will normally remain in neutral position, and a pointer associated with said spring to measure the amount of deflection of said beam beyond such position.

4. A scale, including, in combination, a rockingly-mounted beam, a spring, means for securing the lower end of said spring against movement and at a point above the plane of pivotal mounting of the beam, a registering mechanism, one of the elements of which is fixedly secured to the upper end of said spring, and means connecting said beam with said upper spring end whereby the latter tends to retain the former in neutral position, said registering mechanism indicating the amount of deflection of said beam beyond such position.

5. A scale, including, in combination, a rockingly-mounted beam, a spring, means for securing the lower end of said spring against movement and at a point above the plane of pivotal mounting of the beam, a registering mechanism, one of the elements of which is fixedly secured to the upper end of said spring, rigid means fixedly secured to said beam and means providing a friction connection between said rigid means and the upper spring end whereby to tend to retain said beam in neutral position, said registering mechanism measuring the amount of deflection of said beam beyond such position.

6. A scale, including a rockingly-mounted beam, a spring, means for mounting the lower end of said spring at a point above the plane of mounting of said beam, registering mechanism, one of the elements of which is rigidly attached to the upper end of said spring, a post secured to said beam, and a link having its ends pivotally connected one to said post and the other with said upper spring end.

7. A scale, including a pivotally-mounted beam, a spring mounted to have its lower end fixed and its upper end free to move in an arcuate path, and means connecting said beam with said spring.

8. A scale, including a pivotally-mounted beam, a spring mounted to have its lower end fixed and its upper end free to move in an arcuate path, means connecting said beam with said spring, and registering means having one of its elements connected with the upper end of said spring for measuring the amount of deflection thereof.

9. A scale, including a pivotally-mounted beam, a spring mounted to have its lower end fixed and its upper end free to move in an arcuate path, means connecting said beam with said spring, the pivots of said beam and the operative lower end portion of the spring being nonaligned, and registering means having one of its elements connected with the upper end of said spring for measuring the amount of deflection thereof.

10. A scale, including, in combination, a beam, a mounting member, a pointer, a normally straight flexion strip having one of its ends free to rock and secured to said pointer, its opposite end being secured to said mounting member, and means for connecting said beam to said pointer.

11. A scale, including a rockingly-mounted beam, linkage, means for mounting one end of said linkage, the opposite end thereof being connected with said beam, and said linkage including a spring or flexion strip whereby the beam tends normally to assume a neutral and balanced position under the influence of such strip or spring.

12. A scale, including a rockingly-mounted beam, linkage, means for mounting one end of said linkage, the opposite end thereof being connected with said beam, and said linkage including a spring or flexion strip extending substantially at right angles to the longitudinal axis of the beam, the latter tending normally to assume a neutral position under the influence of such strip or spring.

13. A scale, including a rockingly-mounted beam, linkage, means for mounting one end of said linkage, the opposite end thereof being connected with said beam, and said linkage including a spring or flexion strip arranged at one end thereof and secured to said mounting whereby the beam tends normally to assume a neutral and balanced position under the influence of such strip or spring.

14. A scale, including a rockingly-mounted beam, linkage, means for mounting one end of said linkage, the opposite end thereof being connected with said beam, and said linkage including a spring or flexion strip arranged at one end thereof and secured to said mounting means whereby the beam tends normally to assume a neutral position under the influence of such strip or spring, and a post secured to said beam and forming a part of said linkage.

15. A scale, including a rockingly-mounted beam, linkage, means for mounting one end of said linkage, the opposite end thereof being connected with said beam, and said linkage including a spring or flexion strip arranged at one end thereof and secured to said mounting whereby the beam tends normally to assume a neutral position under the influence of such strip or spring, a post secured to said beam and forming a part of said linkage, and means for adjusting said post relatively to said beam.

16. A scale, including a rockingly-mounted beam, linkage, means for mounting one end of said linkage, the opposite end thereof being connected with said beam, and said linkage including a spring or flexion strip arranged at one end thereof and secured to said mounting whereby the beam tends normally to assume a neutral position under the influence of such strip or spring, a post secured to said beam and forming a part of said linkage, and a link-member interposed between and having its ends pivotally connected with said post and spring.

17. A scale, including a rockingly-mounted beam, linkage, means for mounting one end of said linkage, the opposite end thereof being connected with said beam, and said linkage including a spring or flexion strip arranged at one end thereof and secured to said mounting member whereby the beam tends normally to assume a neutral position under the influence of such strip or spring, the strip or spring being substantially in line with the axis of rocking of said beam and the connection between such linkage and beam being to one side of said beam axis.

18. A scale, including a rockingly-mounted beam, a vertically extending spring strip arranged at right angles to the axis of rocking of such beam, and means for connecting the strip and beam to cause the latter normally to assume a neutral position.

19. A scale, including a rockingly-mounted beam, a vertically extending spring strip arranged at right angles to the axis of rocking of such beam, means for connecting the strip and beam to cause the latter normally to assume a neutral position, a pointer secured to and extending from the upper end of the spring, and means engaging said spring whereby said pointer will have a greater movement than the movement of said beam.

20. A scale including a rocking beam, a mounting member therefor and a flexion strip comprising a relatively short and stiff body having one of its ends connected to one of said elements, its opposite end being free to flex and connected with the second of said elements whereby to normally maintain said beam in neutral position, the connection of said strip with said beam being adjacent the point of mounting of the latter.

21. A scale including a rocking beam, a mounting member therefor, a flexion strip comprising a relatively short and stiff body having one of its ends connected to one of said elements, its opposite end being free to flex and connected with the second of said elements, whereby to normally maintain said beam in neutral position, and a registering mechanism connected to said scale parts to register the position thereof, the connection of the registering mechanism to said scale parts being adjacent the point of rocking mounting of the beam and the connection of said strip being likewise adjacent the point of beam mounting.

22. A scale including a rockingly mounted beam, a rigid member connected with said beam to be moved thereby, a standard, a flat resilient strip carried by said standard and means for connecting said strip to the upper end of said rigid member whereby said beam normally tends to maintain an even-balance condition.

23. A scale including a rockingly mounted beam, a rigid member connected with said beam to be moved thereby, a standard, a flat resilient strip carried by said standard, means for connecting said strip to the upper end of said rigid member whereby said beam normally tends to maintain an even-balanced condition and a registering mechanism including dial and pointer elements, one of said elements being likewise connected to said strip to register the amount of movement of said beam.

24. A scale including a rockingly mounted beam, a standard, a resilient element carried by said standard, a rigid member connected to said beam and to one side of the point of the mounting thereof, means for connecting the upper end of said rigid member to said resilient element whereby the latter will cause said beam to normally assume an even-balance condition and a registering mechanism connected with said member to indicate the position of said beam.

25. A scale including a rockingly mounted beam, a standard extending adjacent thereto, a normally straight flat resilient strip supported by said standard and means for connecting said strip to said beam and including a single member having its lower end connected to said beam and to one side and adjacent to the point of mounting thereof and the upper end of said member being in association with said strip.

26. A scale including a rockingly mounted beam, a standard extending adjacent thereto, a flat resilient strip supported by said standard and means for connecting said strip to said beam and including a rigid member having its lower end connected to said beam and to one side of the point of mounting thereof and the upper end of said member being in association with said strip and a registering mechanism having one of its elements connected to said strip and member to register the amount of deflection of said beam.

27. A scale including a base, a beam rockingly mounted thereon, a registering mechanism including two relatively movable parts, a resilient element mounting one of said parts, a link pivotally connected to said element and a pair of actuating members, one mounted by said beam and the other by said base, one of said members carrying said resilient element and the other being connected to said link, whereby rocking movement of said beam with respect to said base will result in relative movement of the parts of said registering mechanism.

28. A scale including a base, a beam, means extending from said base to support said beam substantially intermediate its extremities, a registering mechanism including two relatively movable parts, a resilient element mounting one of said parts, a link pivotally connected to said element and a pair of actuating members, one mounted by said beam and the other by said base, one of said members extending substantially in line with the point of mounting of said beam and the other of said members extending immediately adjacent to said point of mounting and, moreover, one of said members carrying said resilient element and the other of the same being connected to said link.

29. A scale including a rockingly mounted beam, a post extending from said beam, a link having one of its ends connected to said post, a resilient element, a registering mechanism including two relatively movable parts, said element mounting one of said parts, and means for connecting the opposite end of said link to said element.

30. A scale including a rockingly mounted beam, a post extending from said beam, a link having one of its ends connected to said post, a resilient element, a registering mechanism including two relatively movable parts, said element mounting one of said parts, means for connecting the opposite end of said link to said element, said resilient element being disposed substantially in line with the point of mounting of said beam and said post being arranged to one side thereof.

31. A scale including a rockingly mounted beam, a resilient element, means for supporting said element substantially in line with the point of mounting of said beam, a link connected to said resilient element, a registering mechanism including two relatively movable parts, one of said parts being carried by said element, a member mounting the outer end of said link and extending to one side of the member mounting said resilient element, one of said mounting members being connected to move with said beam and the other of the same being fixed against movement.

32. A scale including a rockingly mounted beam, a resilient element, a registering mechanism, one of the parts of said mechanism being carried by said element, a fixed mounting member for said element, a link extending from said element and a post connected to said beam and extending adjacent to the point of rocking mounting thereof and said link being connected to said post.

33. A scale including a beam, a base rockingly mounting said beam, a resilient element having one of its ends connected to said base, its body extending upwardly therefrom and substantially at right angles to the normal axis of said beam, and a registering mechanism including two parts, one of said parts being fixed against movement with respect to said base, the other of said parts being connected to said resilient element and beam to move in response to movements of the latter.

In testimony whereof I affix my signature.
GEORGE WALKER.